United States Patent
Andersen

(10) Patent No.: US 8,646,596 B2
(45) Date of Patent: Feb. 11, 2014

(54) TRANSVERSE BELT

(75) Inventor: Kenneth Westergaard Andersen, Vejle (DK)

(73) Assignee: Ammeraal Beltech Modular A/S, Vejle (DK)

(*) Notice: Subject to any disclaimer, the term of this patent is extended or adjusted under 35 U.S.C. 154(b) by 271 days.

(21) Appl. No.: 12/586,168

(22) Filed: Sep. 17, 2009

(65) Prior Publication Data

US 2010/0078297 A1    Apr. 1, 2010

(30) Foreign Application Priority Data

Sep. 17, 2008 (DK) ................................ 2008 01302

(51) Int. Cl.
*B65G 17/06* (2006.01)

(52) U.S. Cl.
USPC .......................................................... 198/853

(58) Field of Classification Search
USPC .................. 198/844.1, 850, 851, 852, 853
See application file for complete search history.

(56) References Cited

U.S. PATENT DOCUMENTS

| | | | | |
|---|---|---|---|---|
| 2,043,969 | A * | 6/1936 | Kutchers | 198/575 |
| 3,912,071 | A * | 10/1975 | Nielsen | 198/370.06 |
| 4,096,936 | A * | 6/1978 | Nielsen | 198/370.06 |
| 4,815,582 | A * | 3/1989 | Canziani | 198/370.06 |
| 4,824,354 | A * | 4/1989 | Keaton | 425/345 |
| 6,705,452 | B2 * | 3/2004 | Greve et al. | 198/370.02 |
| 7,080,725 | B2 * | 7/2006 | Hishinuma | 198/370.06 |
| 2003/0209405 | A1 | 11/2003 | Greve et al. | |
| 2005/0158158 | A1 * | 7/2005 | Porta | 414/392 |
| 2005/0167241 | A1 * | 8/2005 | Hishinuma | 198/370.06 |
| 2009/0294004 | A1 * | 12/2009 | Stewart | 152/213 R |

FOREIGN PATENT DOCUMENTS

EP    1706337    7/2008

* cited by examiner

*Primary Examiner* — Joseph Dillon, Jr.
(74) *Attorney, Agent, or Firm* — James Creighton Wray

(57) ABSTRACT

Modular belt link for use in endless conveyor belts where each modular belt link has a top surface, a bottom surface having a material thickness between said top and bottom surfaces, a leading and trailing edge, and side edges arranged connecting said leading and trailing edge and said top and bottom surfaces, and where means are arranged along said leading and trailing edge for hingely connecting adjacent modular belt links characterized in that an endless belt is arranged for rotation around at least a portion of the modular belt link.

22 Claims, 10 Drawing Sheets

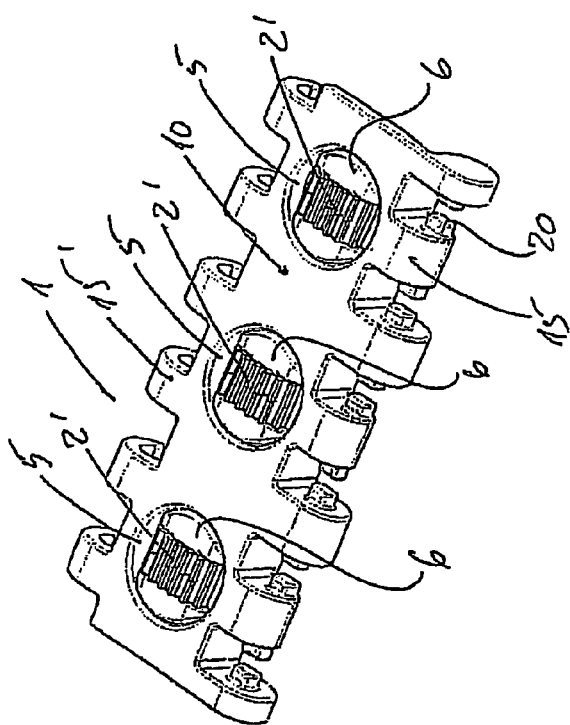
FIG. 2
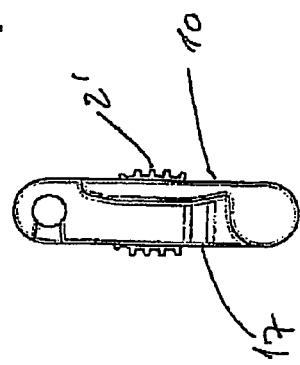
FIG. 4
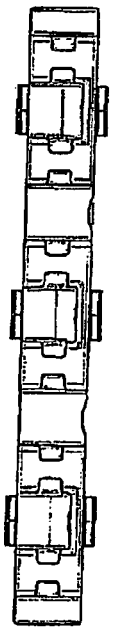
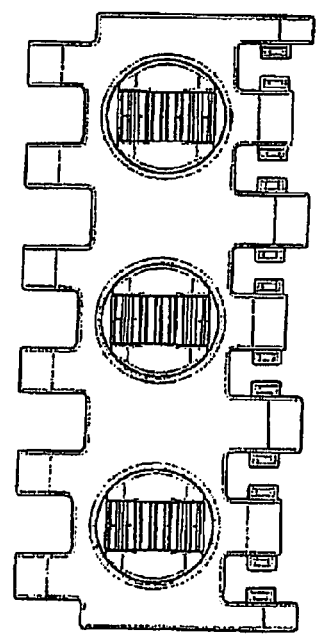

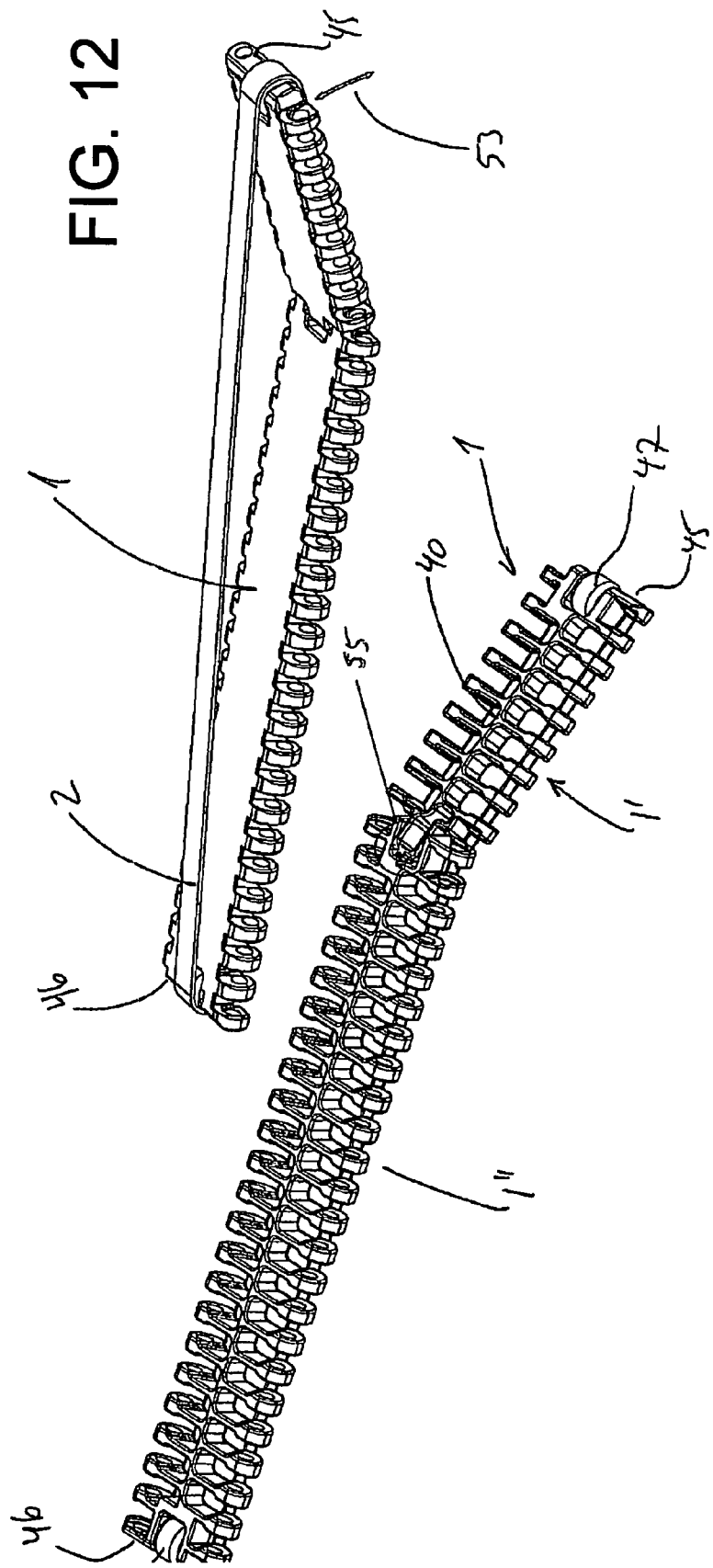

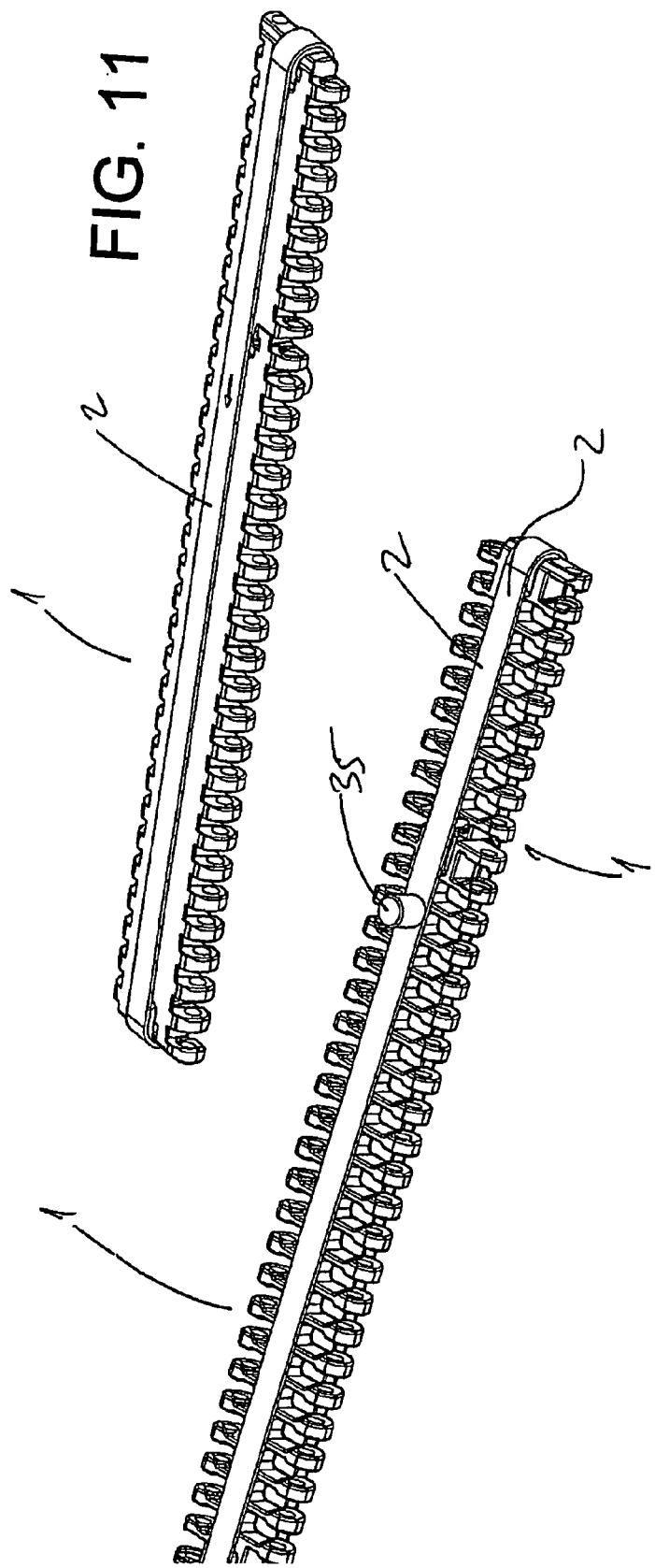

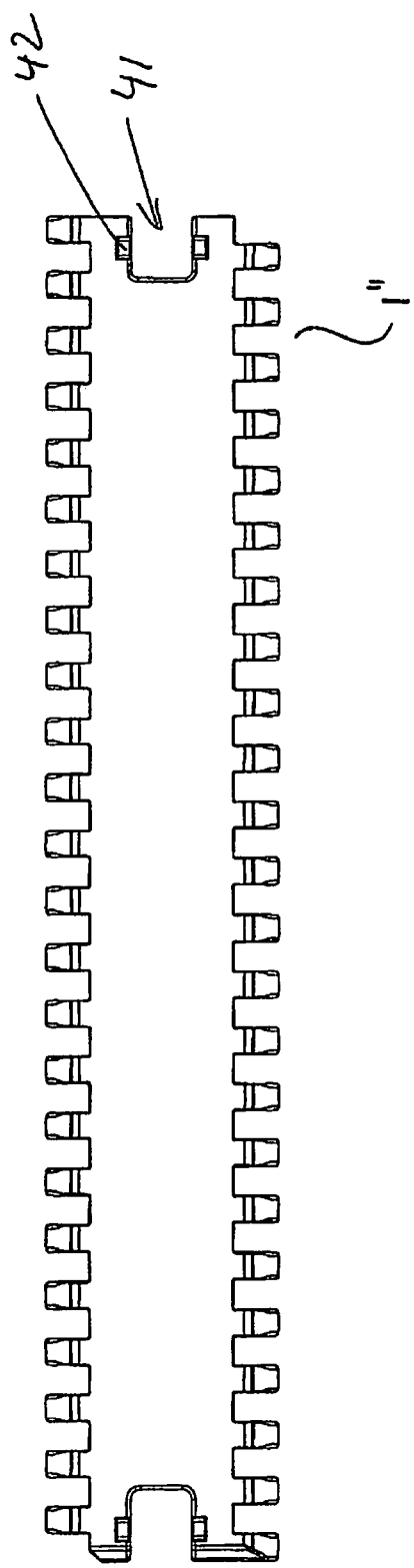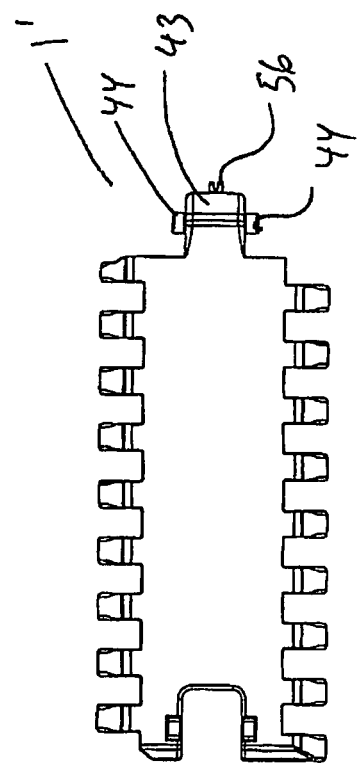
FIG. 13

TRANSVERSE BELT

This application claims the benefit of Danish Application No. PA 2008 01302 filed Sep. 17, 2008, which is hereby incorporated by reference in its entirety.

FIELD OF THE INVENTION

The present invention relates to a modular belt link for use in endless conveyor belts as well as an endless conveyor comprising a plurality of such modular belt links.

BACKGROUND OF THE INVENTION

In the art there are numerous examples of endless conveyor belts made up from a plurality of substantially identical modular belt links which belt links are typically injection moulded.

For certain purposes it is desirable that the endless conveyor belt is able to continue moving whereas the goods or items placed on the conveyor belt remain stationary relative to for example a process station outside the conveyor belt.

Such conveyor belts are generally known as accumulating belts. Other types of belts are provided with rollers or the like such that at certain positions along the conveying part the rollers may be activated in order to displace the objects placed on the conveyor belt in a direction different from the travelling direction of the conveyor belt.

One problem associated with the constructions known in the art is that when desiring to accelerate certain objects carried on the endless conveyor belt, the engagement surfaces between the rollers and the objects to be accelerated do not provide enough friction such that a reliable displacement of the objects may not be achieved.

OBJECT OF THE INVENTION

It is therefore an object of the present invention to alleviate this disadvantage with prior art devices and furthermore provide additional advantages which the prior art constructions are not able to provide.

DESCRIPTION OF THE INVENTION

The present invention therefore provides a modular belt link for use in endless conveyor belts where each modular belt link has a top surface, a bottom surface having a material thickness between said top and bottom surfaces, a leading and trailing edge, and side edges arranged connecting said leading and trailing edge and said top and bottom surfaces, and where means are arranged along said leading and trailing edge for hingely connecting adjacent modular belt links characterised in that an endless belt is arranged for rotation around at least a portion of the modular belt link.

By providing an endless belt instead of a roller, a ball or the like, the contact surface between the object to be accelerated and displaced relative to the travelling direction of the modular belt link is greatly increased, and by selecting the belt material appropriately, substantial friction may be created between the engagement side of the endless belt arranged in the modular belt link and the objects placed on the conveyor. In this manner it is possible to very rapidly and safely accelerate and displace objects, even heavy objects, or low friction objects carried on the conveyor belt away from the conveyor belt structure due to the provision of the endless belts in the modular belt links.

In a further advantageous embodiment the endless belt is arranged for rotation laterally across the belt link around the side edges and the top and bottom surfaces.

By arranging and endless belt laterally across the entire surface of the modular belt link a substantial engagement surface is provided for engaging objects on the conveyor belt such that lateral displacement may be achieved rapidly and safely.

In a still further advantageous embodiment the endless belt is arranged for rotation around the leading and trailing edges and the top and bottom surfaces.

This application is specifically designed for accumulating types of conveyor belts where it is desirable to accumulate a certain number of objects before they are dispatched from the conveyor belt, for example to be packed in crates or the like, where a certain number of objects shall be placed in each layer. Also, in process equipment where downstream processes and upstream processes are not following equal production speeds, it may be necessary to accumulate objects on the conveyor belt awaiting downstream processing.

The modular belt links according to the invention provided with the endless belts like the embodiments already mentioned above therefore provide rapid and safe engagement with the objects when they are to be propelled further downstream.

In a still further advantageous embodiment of the invention the endless belt is arranged for rotation around a section of the belt link.

In some embodiments it might be advantageous to have the endless belts only arranged on a section of their modular belt link such that the belt link will have different characteristics in various areas of the top surface of the belt link.

This may for example be used when the modular belt links are incorporated in a conveyor structure, where it is desirable to sort items or split items into two lanes such that by propelling the items from one side of the modular belt link to the opposite side a divider arranged on the conveyor structure's chassis guides the objects to one or the other lane.

In a further advantageous embodiment of the invention the section around which the endless belt rotates is part of an insert, which insert in use is inserted in a cavity provided in the modular belt links top surface, where said cavity optionally may open towards the bottom surface, and where the insert may be oriented freely in the cavity in relation to the travelling direction of the modular belt link.

With this embodiment it is foreseen that the orientation of the endless belts may be freely chosen relative to the travelling direction of the conveyor belt. Also, should one of the endless belts fail, it is relatively easy to replace and insert also when the engagement characteristics between the endless belt and the objects to be carried need to be altered, for example in cases where special friction properties are present on the objects to be transported.

Naturally, as described in a further embodiment of the invention, a plurality of inserts are provided in a plurality of cavities in each modular belt link.

The endless belt may advantageously be a resilient synthetic or rubber belt

In a still further advantageous embodiment a recess is provided in at least a part of the bottom surface accommodating the endless belt, such that the belt does not protrude from the bottom surface at least along this part of the bottom surface.

By providing a recess the conveyor structure chassis may still be able to engage the underside of the modular belt links in order to transfer the load from the objects placed on the top surface of the modular belt links through to the chassis structure. The recess ensures that the load bearing chassis structure does not interfere with the rotation of the endless belt provided in the modular belt links.

In a further advantageous embodiment the modular belt link is provided either along one or both side edges or the bottom surface with provisions such that the endless belt may be engaged by drive means arranged on a conveyor chassis structure whereby the endless belt may be brought to rotate.

This is particularly interesting, in that the endless belt provided in the modular belt links is not self-driven and therefore needs means in order to propel the endless belts relative to the modular belt links.

This driving force may be provided either along the side edges or along the bottom such that the drive means do not interfere with the conveying surface of the endless conveyor defined by the top surface of the modular belt links.

The invention is also directed to an endless conveyor comprising a plurality of modular belt links of the type used in endless conveyor belts where each link is provided with means for hingely connecting with adjacent substantially identical modular belt links in order to form the endless conveyor belt, where one or more modular belt links may be arranged laterally, characterised in that at least one or more of the modular belt links are provided with an endless belt.

It is clear that such a conveyor will inherently have all the advantages already mentioned above.

DESCRIPTION OF THE DRAWING

The invention will now be explained with reference to the accompanying drawings in which

FIG. 2 illustrates a further embodiment of the invention;

FIG. 4 illustrates a cross section through a modular belt link as illustrated in FIG. 2;

FIG. 9-13 illustrates an example of a foldable belt link.

In FIG. 1 is illustrated a modular belt link according to the invention. The modular belt link 1 has a top surface 10, a bottom surface oppositely (not visible), side edges 11, 12, a leading and trailing edge 13, 14 and means in this embodiment in the shape of eye parts 15 arranged in a staggered manner along the leaving and trailing edges 13, 14 such that by placing two substantially identical modular belt links 1 next to each other it is possible to insert the eye parts 15 on one modular belt link into the openings between two adjacent eye parts 15 on the adjacent belt link. The apertures 16 in the eye parts will thereby overlap and it is possible to insert a connection rod/pin laterally thereby hingely connecting two adjacent modular belt links.

Figure 1:
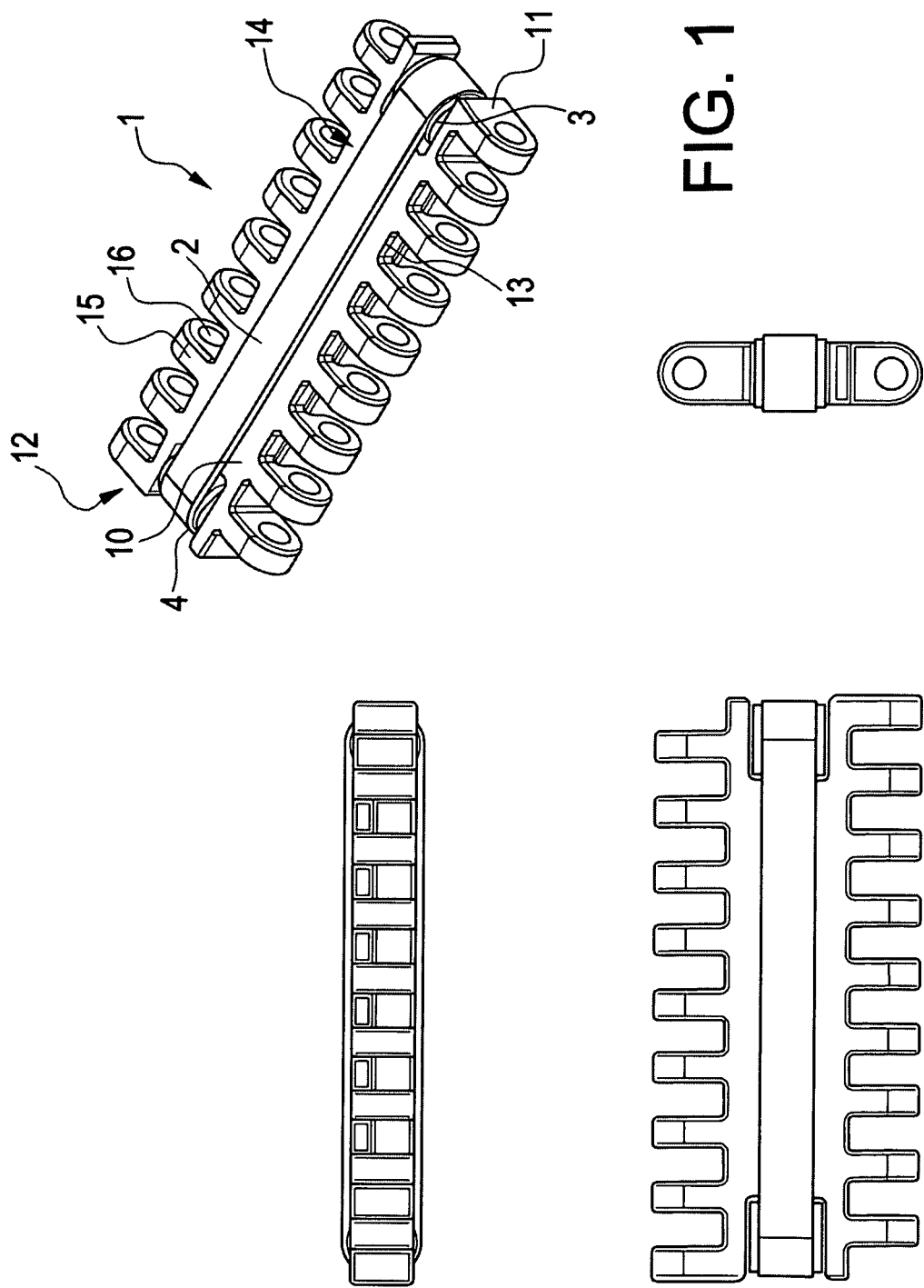
FIG. 1 illustrates a perspective view of one embodiment of the invention.

On the top surface 10 of the modular belt link 1 is provided an endless belt 2 which in this embodiment spans from side edge 11 to side edge 12 on the modular belt link 1. Adjacent the side edges 11, 12 the friction reducing means in the shape of a roller 3,4 around which the endless belt 2 may rotate.

Figure 3:
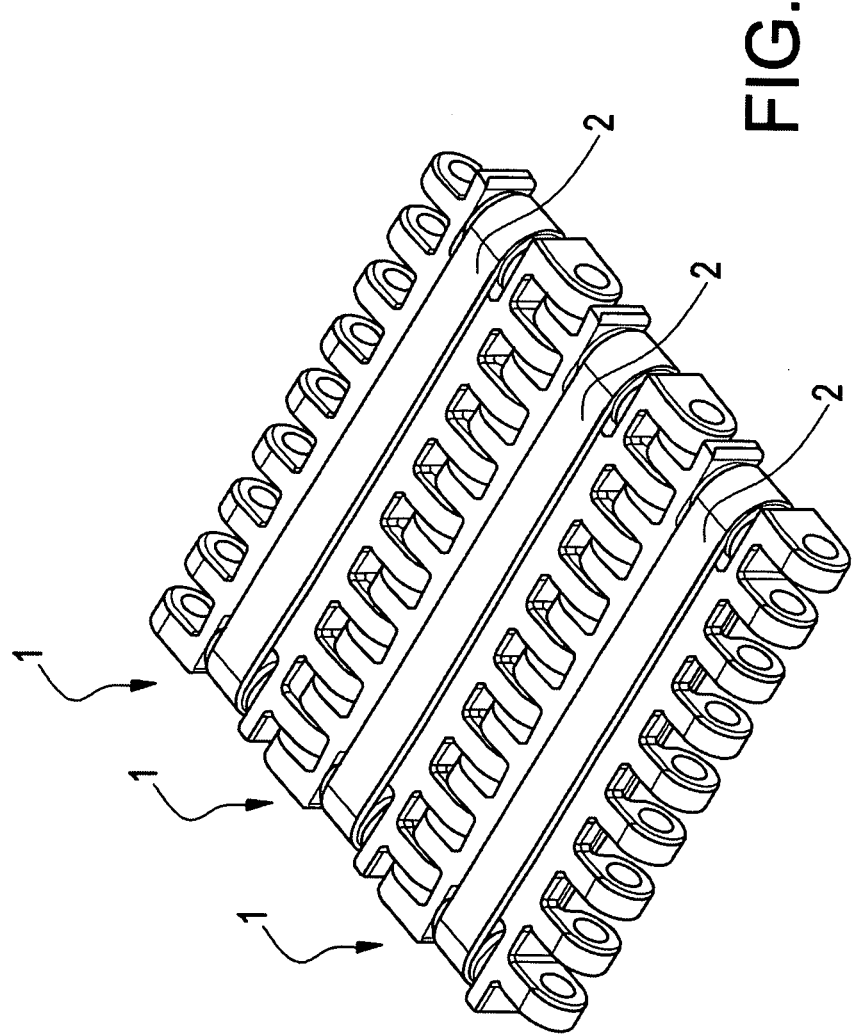
FIG. 3 illustrates a perspective view of a section of an endless conveyor assembled with modular belt links according to the invention.

Turning to FIG. 3 a short section of an endless conveyor comprising in this section three modular belt links according to the invention and as described with reference to FIG. 1 is assembled in order to illustrate one embodiment of an endless conveyor according to the invention.

In FIG. 2 is illustrated yet another embodiment of the invention where the modular belt link 1 is provided with three cavities 5. In each cavity is arranged an insert 6. In this embodiment the insert 6 is frictionally retained against the wall of the cavity 5 such that the insert is firmly held in the cavity 5. Any type of means may be used in order to maintain the inserts in the cavities such as for example snap locking, adhesives and the like.

The inserts are provided with endless belts 2' which are free to rotate around the insert 6 thereby providing the advantages as mentioned above.

The insert may be arranged freely in relation to the cavity such that the direction of rotation of the endless belts 2' may be selected according to circumstances. In this embodiment they are selected to rotate in a direction parallel to the transport direction of the modular belt, but also other directions as for example perpendicular to the travelling direction or any angle in between may be selected according to circumstances simply by rotating the inserts 6 in the cavities 5.

As may be seen from the cross section illustrated in FIG. 4 through a modular belt link as illustrated with reference to FIG. 2 the endless belt 2' extends both above the top surface 10 and the bottom surface 17.

For illustrative purposes the means for hingely connecting the modular belt links illustrated in FIG. 2 to an adjacent substantially identical belt link is illustrated as being different in that in this embodiment protrusions 20 are provided on the eye parts 15 along one edge whereas the eye parts 15' along the opposite edge are provided with receivers 19 for pivotally receiving the protrusions 20.

Generally, the manner in which adjacent modular belt links are assembled has no influence on the invention as such.

Figure 5:
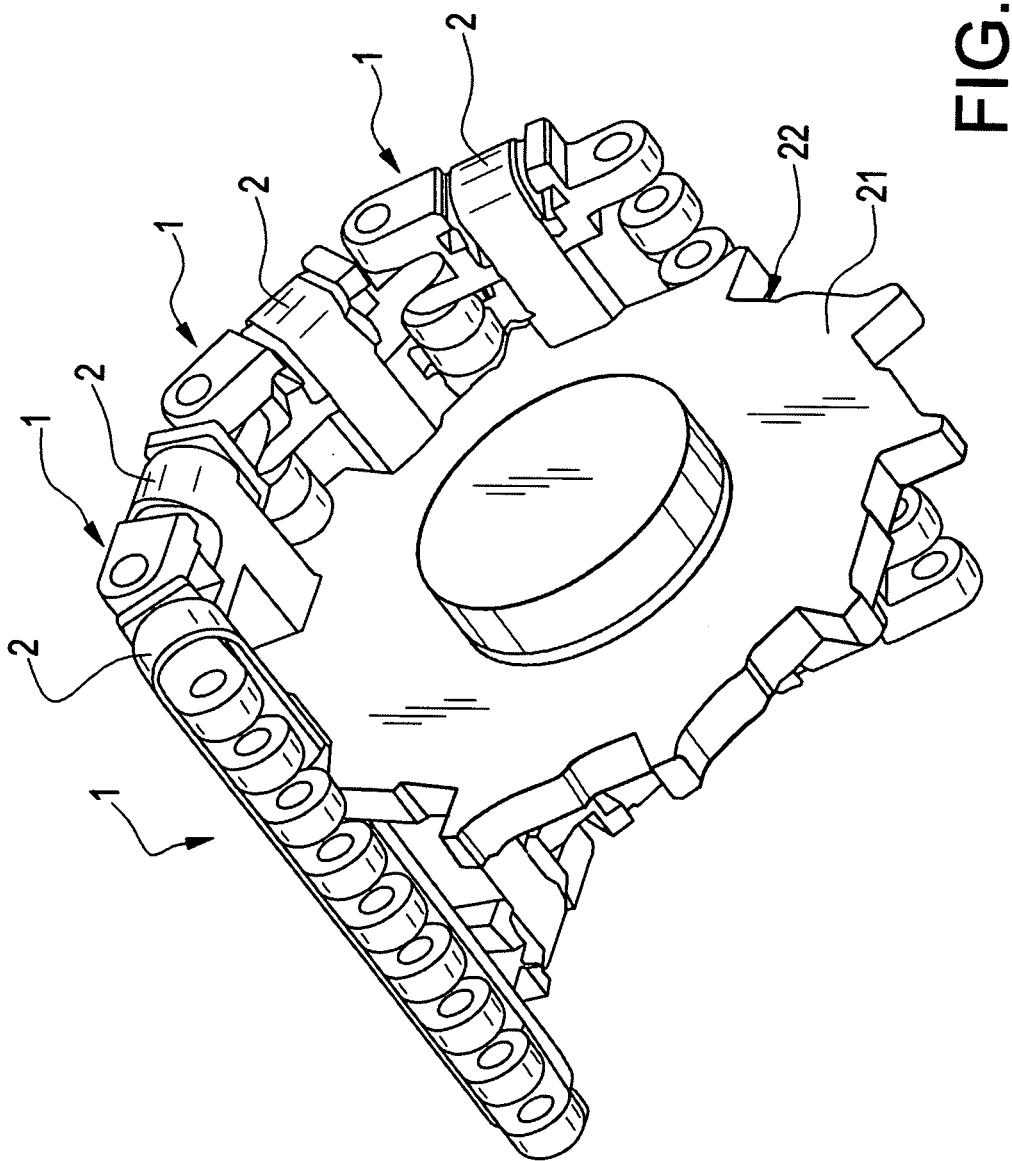
FIG. 5 illustrates a sprocket wheel engaging the underside of modular belt links according to the invention.

Turning to FIG. 5 a section of an endless conveyor made from modular belt links according to the invention as illustrated. The modular belt links are engaged by a sprocket wheel 21 which is used to propel the endless conveyor along the conveying part. As is clear from the configuration of the sprocket wheel recesses 22 are provided in order to create a free space such that the endless belt 2 may freely rotate, also when the endless conveyor belt in engaged by the sprocket wheel.

Figure 6:
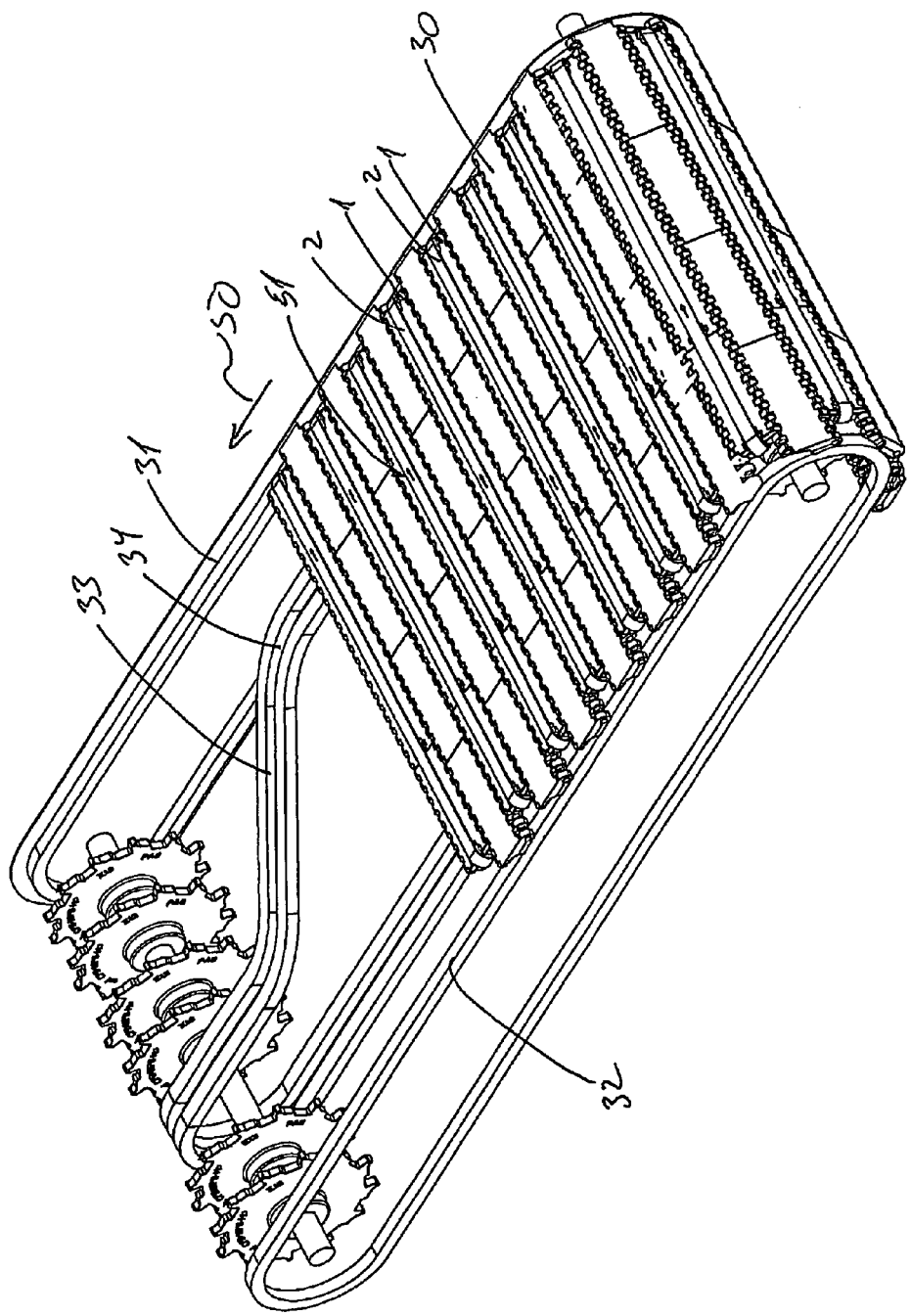
FIGS. 6-8 illustrates an example of a conveyor structure comprising the inventive transverse belt.
Figure 7:
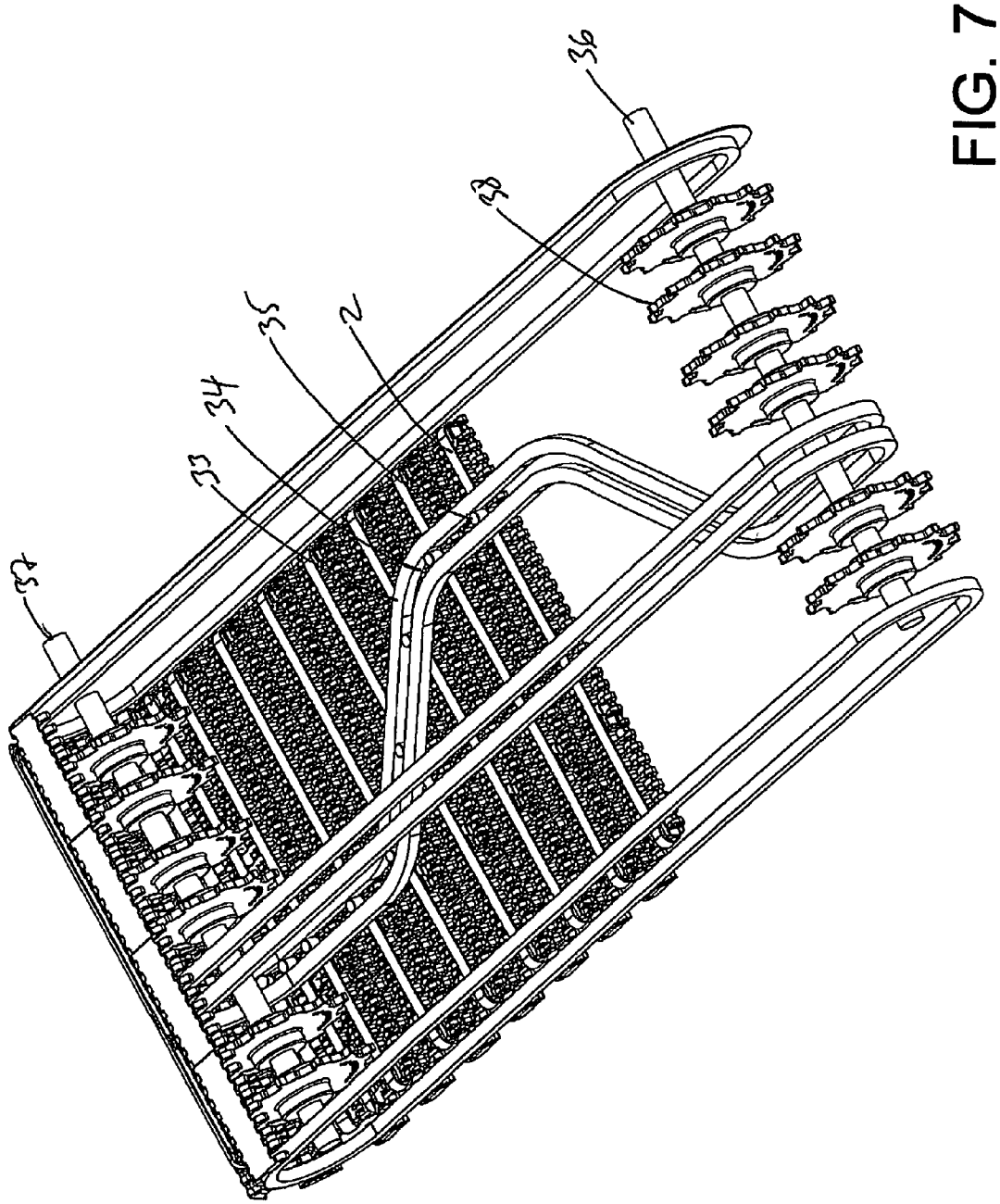
Figure 8:
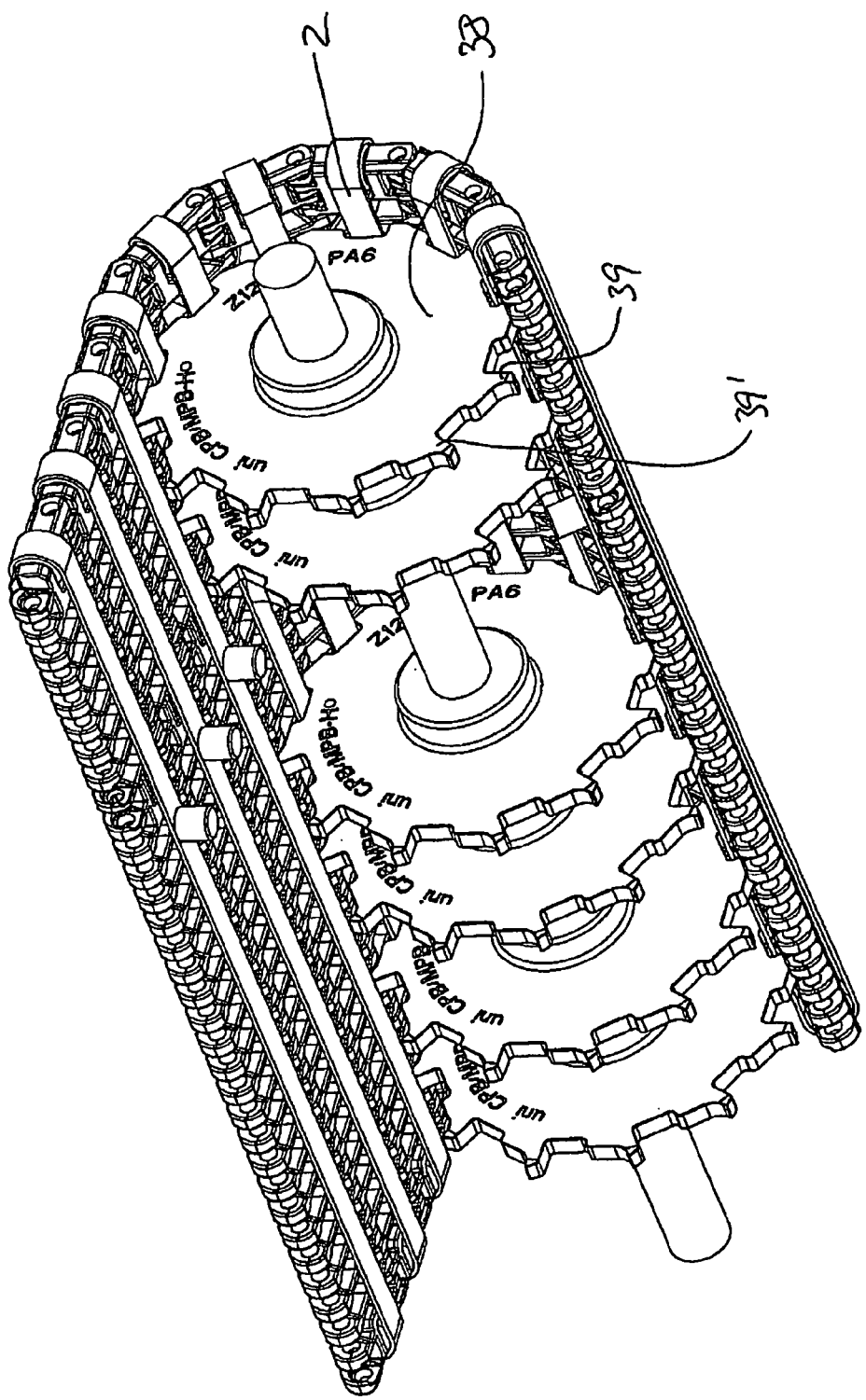

In FIGS. 6, 7 and 8 is illustrated a specific embodiment of the invention where a plurality of belt links 1 provided with transverse belts 2 are assembled into a conveyor. In this embodiment every other belt link is provided with transverse belts 2 such that in between belt links 1 with transverse belts 2 ordinary modular conveyor belt links 30 are provided.

In order to illustrate the underlying structure only part of the conveyor belt is illustrated. The underlying structure comprises a carrying frame 31, 32 which supports the belt links in either side. A further guiding rail 33 is provided where the guiding rail comprises a groove 34. Other suitable support structures may be contemplated without departing from the inventive concept.

Turning briefly to FIG. 10 a belt link according to the invention as illustrated seen from the underside. The transverse belt 2 is provided with a knob 35. This knob 35 is dimensioned such that it will fit into the groove 34, see FIG. 6. As the guide rail 33 changes directions, the knob 35 inserted into the groove 34 will be forced to move in the groove laterally relative to the transport direction indicated by the arrow 50 of the conveyor. As the knob 35 moves in the groove 34 along the rail 33 the transverse belt attached to the knob 35 will likewise create a rotation or a lateral movement thereby moving any objects placed on the conveyor's top surface in the desired direction.

For example in FIG. 6 the guide rail 33 moves from the right hand side of the conveyor towards the left hand side of the conveyor whereby the knob will be forced to pull from the right to the left, whereby the top of the transverse belt 2 will move in the direction indicated by the arrows 51.

In FIG. 7 is the same conveying structure as illustrated in FIG. 6 illustrated but seen from below where it is evident that the knobs 35 are arranged in the groove 34 in the guide rail 33 and thereby forced to move the transverse belts 2 in accordance with the movement of the knob 35.

The conveyor belt is in a traditional manner arranged around two axles 36, 37 which axles 36, 37 are provided with sprocket wheels 38.

In FIG. 8 are illustrated details of how the sprocket wheel engages and drives the conveyor belt. The sprocket wheels are provided with engagement teeth 39 which are suitable to engage cams 40 (see FIG. 9) on the backside of the belt links 1. The teeth 39 are spaced such that a free space between two adjacent teeth, see for example 39 and 39' will be able to accommodate the width of a transverse belt 2 and still be able to engage the cams 40 as shown in FIG. 9 arranged on each belt link.

In a particular embodiment of the invention as illustrated in FIG. 9 the belt links 1 are provided in two separate parts 1', 1" as illustrated in more detail in FIG. 13. The two parts 1', 1" of the belt links are connected by providing an aperture 41 provided with slots 42.

The other part of the belt link module 1' is provided with a protrusion 43 dimensioned to fit inside the aperture 41. On the side of the protrusion 43 are provided knobs 44 which are suitable to be inserted in the slots 42 thereby hingely connecting the two parts 1', 1" of the belt link. In this manner is provided that the belt link as illustrated in FIG. 9 may be "broken", i.e. one part 1' may be tilted relative to the other part 1", whereby the distance between the ends 45, 46 is shortened relative to the same belt link in a completely flat configuration. In this manner it becomes easy to fit the transverse belt 2 as illustrated in FIG. 12 around the ends 45, 46 of the belt link 1.

In order to lessen the friction between the belt link 1 and the belt 2 the ends 45, 46 may be provided with rollers 47 whereby the friction between the belt 2 and the belt link 1 is substantially lessened. Alternatively low friction inserts may be provided.

By flexing the belt link 1 as indicated by the arrow 53 in FIG. 12 the transverse belt 2 may be installed or replaced. In use the belt link will be in a configuration as illustrated with reference to FIGS. 10 and 11. In this configuration the belt link 1 is completely flat, and the transverse belt 2 is held in a completely flat configuration adjacent the top surface of the belt link 1.

In this configuration the belt link will have attained its standard dimensions such that it will suitable to be arranged in a conveyor belt as illustrated for example in FIG. 6.

As the two belt link parts 1', 1" are rotated as illustrated by the arrow 53 into a flat configuration as illustrated with reference to FIGS. 10 and 11, a locking mechanism 55, as shown in FIG. 9, will be engaged whereby the two halves are mechanically fixed in a releasably manner, i.e. should a desire to replace the belt 2 arise, the link 1 may be "broken" and the old belt replaced by a new belt. The locking mechanism comprises a gripping member 56, see FIG. 13, which engages with a cam (not illustrated) provided in the aperture 41 in FIG. 13.

The invention claimed is:

1. Endless conveyor comprising a plurality of modular belt links used in endless conveyor belts where each link is provided with means for hingely connecting with adjacent substantially identical modular belt links in order to form the endless conveyor belt, where one or more modular belt links is arranged laterally, wherein at least one or more of the modular belt links has a top surface, a bottom surface, a material thickness between said top and bottom surfaces, leading and trailing edges, and opposite side edges, wherein the means for hingely connecting the adjacent belt links are laterally arranged on the leading and trailing edges, and wherein, an endless belt is arranged on the top surface and for rotation around at least a portion of the modular belt link.

2. Endless conveyor according to claim 1, wherein the endless belt is arranged for rotation laterally across the top surface belt link around the side edges and the top and bottom surfaces.

3. Endless conveyor according to claim 1, wherein the endless belt is arranged for rotation around the leading and trailing edges of portions of the top and bottom surfaces.

4. Endless conveyor according to claim 1, wherein the endless belt is arranged for rotation around a section of the modular belt link.

5. Endless conveyor according to claim 4, wherein the section around which the endless belt rotates is part of an insert, which insert in use is inserted in a cavity provided in the modular belt links top surface.

6. Endless conveyor according to claim 5, wherein a plurality of inserts are provided in a plurality of cavities in each modular belt link.

7. Endless conveyor according to claim 1, wherein the endless belt is a resilient synthetic or rubber belt.

8. Endless conveyor according to claim 1, wherein a recess is provided in at least a part of the bottom surface accommodating the endless belt, such that the belt does not protrude from the bottom surface at least along this part of the bottom surface.

9. Endless conveyor according to claim 1, wherein either along one or both side edges or the bottom surface of the modular belt link, provisions are provided such that the endless belt may be engaged by drive means arranged on a conveyor chassis structure whereby the endless belt may be brought to rotate.

10. Endless conveyor according to claim 5, wherein said cavity opens toward the bottom surface.

11. Endless conveyor according to claim 5, wherein the insert is oriented freely in the cavity in relation to the traveling direction of the modular belt link.

12. Endless conveyor according to claim 1, wherein the connectors are arranged along said leading and trailing edge for hingely connecting adjacent modular belt links, further comprising multiple spaces interfitting eye parts along the leading and trailing edges, the eye parts along one of the leading and trailing edges have protrusions extending laterally from the eye parts, and the eye parts along leading and trailing edges have complementary holes for receiving the protrusions.

13. Endless conveyor according to claim 1, further comprising the modular belt link having the endless belt connected between similar modular belt links without endless belts.

14. Endless conveyor according to claim 1, further comprising carrying frames that support the belt links on opposite sides.

15. Endless conveyor according to claim 1, wherein the belt link has recesses in its opposite sides.

16. Endless conveyor according to claim 15, wherein rollers are supported on axles which extend through the recesses.

17. Endless conveyor according to claim 1, wherein the belt link is divided into two belt link parts, wherein a first part of the two belt link parts has recesses in opposite ends, wherein a second part of the two belt link parts has a protrusion in one end and the protrusion fits into one of the recesses in the first part, and wherein the protrusion and recess are connected by a hinge for hinging the two parts about the hinge when replacing the endless belt.

18. Endless conveyor according to claim 17, wherein the hinge comprises knobs extending from opposite sides of the protrusion and complementary slots extending into opposite walls of the recess for receiving the knobs.

19. Endless conveyor according to claim 17, further comprising a locking mechanism having a gripping member for holding the two parts aligned.

20. An endless conveyor according to claim 1, each, modular belt link having a top surface, a bottom surface, a material thickness between the top surface and bottom surface, leading and trailing edges, and opposite side edges, a plurality of eye part members extending from the leading and trailing edges, the plurality of eye parts on the leading edge configured to hingely connect to the plurality of eye parts on the trailing edge of an adjacent modular belt link, wherein the plurality of eye part members are arranged laterally on the leading and trailing edges, wherein each eye part member has an aperture, and wherein an endless belt is arranged to rotate laterally around the top surface, the side edges and the bottom surface of the belt link, and a depending knob attached to the endless belt, wherein the depending knob is configured to meet groove dimensions of a guiding rail.

21. The endless conveyor of claim 1, further comprising a depending knob attached to the endless belt, wherein the knob is configured to meet groove dimensions of a guiding rail.

22. The endless conveyor of claim 21, wherein the depending knob which meets the groove dimensions of the guiding rail is forced to move in the groove laterally relative to a transport direction of the conveyor, and wherein the endless belt is forced to move or rotate relative to the depending knob.

\* \* \* \* \*